United States Patent [19]

Fekete et al.

[11] Patent Number: 4,911,011

[45] Date of Patent: Mar. 27, 1990

[54] GAUGE WITH MAGNETICALLY DRIVEN VOLTAGE DIVIDER

[75] Inventors: Nicholas M. G. Fekete, Richardson; James R. Howeth, Milford, both of Tex.

[73] Assignee: Rochester Gauges, Inc., Dallas, Tex.

[21] Appl. No.: 265,769

[22] Filed: Nov. 1, 1988

[51] Int. Cl.⁴ .................. G01F 23/36; G01F 23/38
[52] U.S. Cl. .................. 73/313; 73/DIG. 5; 73/308; 338/33
[58] Field of Search ............ 73/308, DIG. 5; 338/12, 338/33

[56] References Cited

U.S. PATENT DOCUMENTS

| | | | |
|---|---|---|---|
| 1,304,022 | 5/1919 | Cole | 338/33 X |
| 2,992,560 | 7/1961 | Morgan et al. | 73/317 |
| 3,688,795 | 9/1972 | Taylor | 73/DIG. 5 |
| 3,709,038 | 1/1973 | Werner | 73/DIG. 5 |
| 3,739,641 | 6/1973 | Taylor et al. | 338/33 X |
| 4,688,587 | 8/1987 | Bourgeon | 73/313 |

Primary Examiner—Daniel M. Yasich
Attorney, Agent, or Firm—Richards, Medlock & Andrews

[57] ABSTRACT

A gauge assembly (10) is disclosed which incorporates a voltage divider circuit to provide reliable and accurate measurement of a fluid level within a tank (16) or other environment. A pointer assembly (52) pivots about an axis (42) in response to a moving float to indicate the fluid level. A plurality of contact arms (92, 94, 96) extending from a contact plate (58) on the pointer assembly (52) resiliently engage a point (91) along a resistive element (84). The ends of the resistive element (84) form first and second contacts (86, 88) while the point (91) of contact between the contact arms and resistive element is connected to a third contact (90) to form a voltage divider circuit.

12 Claims, 1 Drawing Sheet

GAUGE WITH MAGNETICALLY DRIVEN VOLTAGE DIVIDER

TECHNICAL FIELD

This invention relates to a gauge for measuring a fluid level, and in particular to a gauge incorporating a voltage divider.

BACKGROUND OF THE INVENTION

Fluid sensing gauges are used in many applications. A common type of gauge is the float gauge, which mounts a float which floats atop the surface of the fluid being measured. The float is connected to a pivot arm or member which moves with the float as the fluid level changes. Movement of the arm is sensed by a gauge, typically through a magnetic coupling, to provide an indication, either visual or otherwise, of the fluid level.

A common float gauge used for many years incorporates a variable resistor in the gauge to vary a resistance with a change in the fluid level. In such a gauge, a wiper arm is moved along a resistance element as the float changes level. The resistance is measured between one end of the resistance element and the wiper arm, which corresponds to the float position. While such a circuit is effective, it does suffer certain disadvantages. These disadvantages include the requirement for adjusting the resistance output to correspond to the float position. Further, change in such variables as contact resistance, hook-up wire length, temperature, and voltage applied across the resistance can actually vary the response of the gauge, leading an inability to reproduce results and maintain gauge accuracy.

A need therefore exists for an improvement in the basic float gauge apparatus which overcomes the deficiencies of the variable resistor gauge.

SUMMARY OF THE INVENTION

In accordance with one aspect of the present invention, a gauge assembly is provided for measuring a fluid level. The gauge assembly includes a gauge having a resistive element with first and second ends. A first contact is formed at the first end and a second contact is formed at the second end. A movable element is provided which has a conductive arm in electrical contact with the resistive element at a point along the resistive element. A third contact is electrically connected to the conductive arm. Structure is provided for sensing the level of the fluid and for moving the movable element and contact arm to a position along the resistive element corresponding to the level sensed. The gauge assembly thereby forms a voltage divider circuit indicating the fluid level.

In accordance with another aspect of the present invention, the movable element is mounted within the gauge for rotation about an axis. The resistive element and contacts are formed on a plate of non-conductive material lying generally perpendicular to the axis and proximate the movable element. The resistive element is formed in a semi-circular arc on the plate at a predetermined radius from the axis, the axis passing through the third contact.

BRIEF DESCRIPTION OF THE DRAWINGS

Further objects and advantages of the invention will become more apparent from the following description and claims, and from the accompanying drawings, wherein:

DETAILED DESCRIPTION

Figure 1:
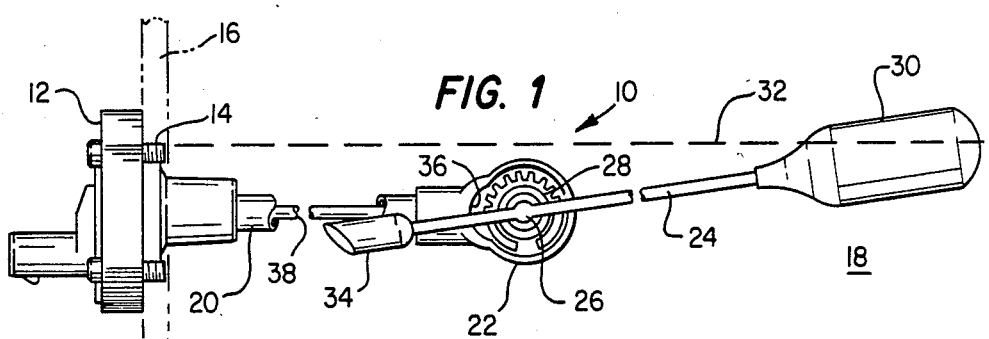
FIG. 1 is a view of a gauge assembly forming a first embodiment of the present invention.
Figure 2:
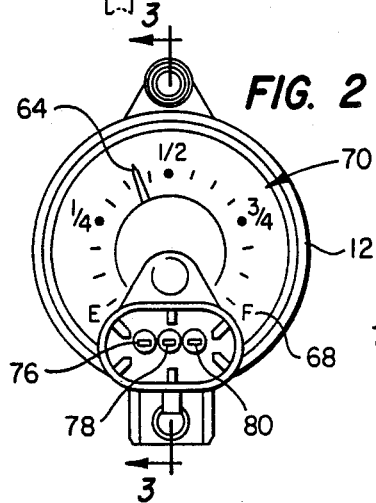
FIG. 2 is a front view of the gauge.

With reference now to the drawings, and particularly to FIG. 1, a gauge assembly 10 forming a first embodiment of the present invention is shown. The gauge assembly 10 includes a gauge 12 which is mounted by bolts 14 at a convenient position on the wall of a tank 16 containing a fluid 18. An arm 20 extends from the gauge 12 and into the tank to a fitting 22. An arm 24 is pivoted along its length to fitting 22 for pivotal motion about an axis 26. A gear 28 is mounted on arm 24 for movement with the arm. A first end of the arm mounts a float 30 which is so configured as to float at surface 32 of the fluid. At the opposite end of the arm is counterweight 34. The gear 28 meshes with a gear 36 on a shaft 38 extending within the arm 20 to near gauge 12. The end of the rod 38 proximate the gauge mounts a magnet 40. As will be apparent, the pivot arm 24 will pivot about axis 26 as the float 30 follows the level of the fluid. The pivotal motion of the arm causes gear 28 to rotate gear 36 and rod 38 to rotate the magnet 40 about an axis 42.

With reference to FIGS. 2-5, the effect of the movement of magnet 40 about axis 42 will affect the gauge 12 as described hereinafter. The gauge has a base 44, including a recess 46 and a pivot pin 48 extending within the recess and along the axis 42. An annular surface 50 forms a perimeter about the recess 46.

A pointer assembly 52 is provided with a recess 54 to fit over the pivot pin 48 on base 44. The pointer assembly 52 this can pivot or rotate about axis 42 with relatively little friction. On the side of pointer assembly 52 opposite recess 54 is formed a disc shaped recess 56 which receives a contact plate 58. Alignment protrusion 60 on pointer assembly 52, and mating alignment groove 62 on the contact plate 58, orient the plate relative to assembly 52 about axis 42. A pointer 64 extends outwardly from one side of the assembly 52 generally along a radius extending from the axis 42. A magnet 66 is secured to pointer assembly 52 and interacts with the magnet 40 so that the position of the pointer assembly 52 about axis 42 correlates directly with the position of the float 30, and thus the fluid level.

An annular face plate 68 rests on the surface 50 and includes visible indicia 70 to correlate the position of the pointer 64 with the fluid level in the tank.

Mating with the base 44 is a cover 72, preferably formed of a clear plastic. Integral with cover 72 is an electrical connector 74 with three prong contacts 76, 78 and 80. Mounted within the cover 72 is a board 82 of non-conductive material. On one side of board 82 is deposited a resistive element 84 formed in a generally semi-circular arc and ending in a first contact 86 at one end and a second contact 88 at the opposite end. A third contact 90 is formed on the board and electrically isolated from the resistive element 84 and first and second contacts 86 and 88. The prong contact 76 is soldered to the first contact 86. The prong contact 78 is soldered to the third contact 90. The prong contact 80 is soldered to the second contact 88.

Figure 3:
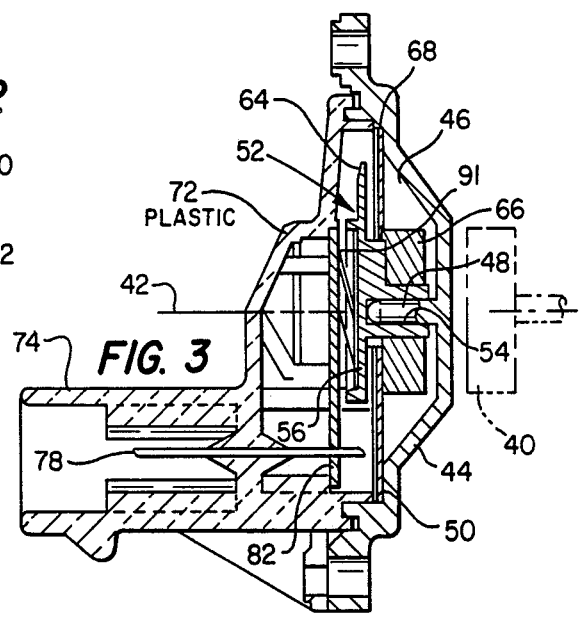
FIG. 3 is a vertical cross sectional view of the gauge taken along line 3—3 in FIG. 2.

When the cover 72 is assembled on base 44, as seen best in FIG. 3, the third contact 90 will extend over axis 42. Similarly, the semi-circular arc of the resistive element 42 will be seen to define a semicircular arc about the axis 42 at a predetermined radius from the axis 42.

Figure 5:
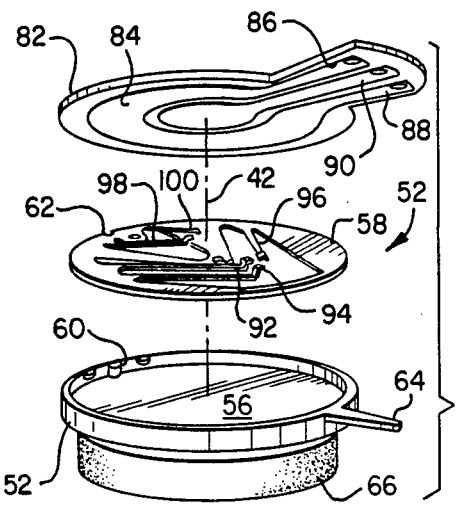
FIG. 5 is an exploded perspective view of the components of the gauge.

With reference to FIG. 5, the contact plate 58 can be seen to include resilient contact arms 92, 94 and 96 which resiliently engage the resistive element 84 at a point 91 on the resistive element determined by the position of the float level. The plate 58 can also be seen to have resilient center contact arms 98 and 100 which are resiliently engaged against the third contact 90 of the board 82 to provide a direct electrical connection between the third contact 90 and the point 91 of contact between arms 92, 94 and 96 and the resistive element 84.

Figure 4:
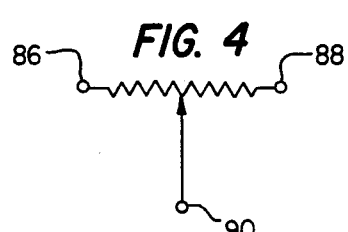
FIG. 4 is a schematic of the voltage divider circuit of the gauge.

With reference to FIG. 4, an electrical schematic of the circuit formed by the gauge is illustrated. It can be seen that this circuit defines a voltage divider which can be connected to an external circuit through connector 74 to provide an accurate representation of the position of point 91, and therefore directly the fluid level in the tank.

Numerous advantages are provided by the gauge assembly 10 incorporating the voltage divider circuit as compared with prior designs. The gauge assembly 10 requires fewer parts and those parts require less labor to produce. No calibration or adjustment is required of the voltage divider circuit and the multiple contact arms ensure reliable operation. The cover 72 and base 44 can be sealed together to form a completely waterproof connection.

The total resistance of the resistive element 84 can vary up to 30% without affecting the accuracy of the system. The resistive element 84 is preferably a thick film element which is believed more durable than a wire wound element. The voltage divider circuit provides infinite resolution and its accuracy is not affected by changes in contact resistance, hook-up wire length, temperature or applied voltage.

In one gauge assembly constructed in accordance with the teachings of the present invention, the resistive element was formed of a conductive polymer with a substrate of glass epoxy. The contact plate, and resilient arms, were formed of nickel silver while the magnets are alnico. The base 44 and cover 72 were both formed of Lexan brand polycarbonate plastic while the pointer 64 was made of acetal. The nominal total resistance of the element 84 between the first and second contacts was 15 Kohms +/−30% with the linearity within 3%. The gauge assembly was designed for a power rating of ½ watt with a voltage range from 1-5 volts DC and a repeatability within +/−0.5%. A response time of ½ second to a change in a fluid level was anticipated.

The voltage divider circuit in effect measures the percentage of voltage drop between the first contact and third contact as compared to the voltage drop across the entire resistive element between the first and second contacts. This is contrasted with a standard resistance sender which only measures the resistance in a portion of a resistance element from one contact to the pick up point. Since all resistance elements vary in resistance with temperature changes and other factors, the output of an ordinary resistance sender will vary with a change in condition as well. The voltage divider circuit measures a percentage of the total voltage, so that when the voltage varies due to changes in resistance or the like, the portion of the voltage being read at a given time will remain the same overall percentage of the total voltage drop. Further, ordinary resistance senders typically employ resistance within a narrow range from 0 to under 300 ohms. If a resistive element is used in the voltage divider circuit of 15,000 ohms, small changes in resistance will provide less effect than those in ordinary resistance senders.

While one embodiment of the present invention has been illustrated in the accompanying drawings, and described n the foregoing Detailed Description, it will be understood that the invention is not limited to the embodiment disclosed, but is capable of numerous rearrangements, modifications and substitutions of parts and elements without departing from the scope and spirit of the invention.

We claim:

1. A gauge assembly for measuring a fluid level, comprising:
   a gauge including;
   (a) a resistive element having first and second ends;
   (b) a first contact formed at the first end of the resistive element;
   (c) a second contact formed at the second end of the resistive element;
   (d) a movable element having a conductive arm in electrical contact with the resistive element at a point along the resistive element; and
   (e) a third contact electrically connected to the conductive arm; and
   means for sensing the level of the fluid and for moving the movable element and the conductive arm to a point on the resistive element corresponding to the fluid level sensed, the gauge thereby forming a voltage divider circuit indicating the fluid level.

2. The gauge assembly of claim 1 wherein the movable element is mounted for rotation about an axis, the resistive element and contacts being formed on a plate of non-conductive material lying generally perpendicular the axis and proximate the movable element, the resistive element formed in a semicircular arc on the plate at a predetermined radius from the axis, the axis passing through the third contact, said movable element further having a central conductive arm in electrical contact with the third contact.

3. The gauge assembly of claim 1 wherein said gauge includes a dial, a pointer being formed on the movable element for indicating the fluid level on the dial.

4. The gauge assembly of claim 1 wherein the gauge further includes a base and a cover, an electrical connector being formed integrally with the cover including three conductive prongs, each prong being in electrical contact with one of said contacts.

5. The gauge assembly of claim 1 wherein the resistive element has a resistance of about 15 Kohms between the first and second contacts.

6. The gauge assembly of claim 1 wherein the movable element has a plurality of conductive arms in electrical contact with the resistive element along the resistive element to provide reliability.

7. A gauge assembly for measuring a fluid level, comprising:
   a base having a recess and a pivot pin extending therefrom;
   a pointer assembly mounted on the pivot pin for rotation about a first axis, the pointer assembly including a contact plate thereon, said contact plate including at least one resilient conductive arm;

a non-conductive plate positioned proximate the pointer assembly, said non-conductive plate including a resistive element formed in a semi-circular arc at a predetermined radius about the axis, the ends of the resistive element forming first and second contacts, a third contact being formed on the plate at the axis;

means to electrically connect the contact plate with the third contact, said resilient contact arm in electrical contact with the resistive element at a point along the resistive element determined by the angular position of the pointer assembly relative to the first axis; and means for moving the pointer assembly about the first axis in response to the fluid level, the gauge assembly thus forming a voltage divider circuit between the first, second and third contacts indicating the fluid level.

8. The gauge assembly of claim 7 wherein said means for electrically connecting the contact plate and third contact comprising a resilient central conductive arm on the contact plate resiliently engaging the third contact.

9. The gauge assembly of claim 7 further defining a cover, the board mounted in the cover, the cover secured to the base to form a fluid tight interior enclosing the pointer assembly, contact plate and board.

10. A gauge assembly for measuring a fluid level in a fluid container where a sensor converts the level of the fluid into proportional rotation of an element about a first axis for an arc of less than 360° between the upper and lower limits of the fluid level measured, the gauge assembly, comprising:

a base having a recess and a pivot pin extending therefrom;

a pointer assembly mounted on the pivot pin for rotation about a first axis, the pointer assembly including a contact plate thereon, said contact plate including at least one resilient conductive arm;

a non-conductive plate positioned proximate the pointer assembly, said non-conductive plate including a resistive element formed in a semi-circular arc at a predetermined radius about the axis, the ends of the resistive element forming first and second contacts, a third contact being formed on the plate at the axis;

means to electrically connect the contact plate with the third contact, said resilient contact arm in electrical contact with the resistive element at a point along the resistive element determined by the angular position of the pointer assembly relative to the first axis; and means for moving the pointer assembly about the first axis in exact correspondence to the motion of the element responsive to the fluid level, the gauge assembly thus forming a voltage divider circuit between the first, second and third contacts indicating the fluid level.

11. The gauge assembly of claim 10 wherein said means for electrically connecting the contact plate and third contact comprising a resilient central conductive arm on the contact plate resiliently engaging the third contact.

12. The gauge assembly of claim 10 further defining a cover, the board mounted in the cover, the cover secured to the base to form a fluid tight interior enclosing the pointer assembly, contact plate and board.

* * * * *